(No Model.) 2 Sheets—Sheet 2.
G. JOHNSON.
VEHICLE WHEEL AND AXLE.
No. 408,240. Patented Aug. 6, 1889.
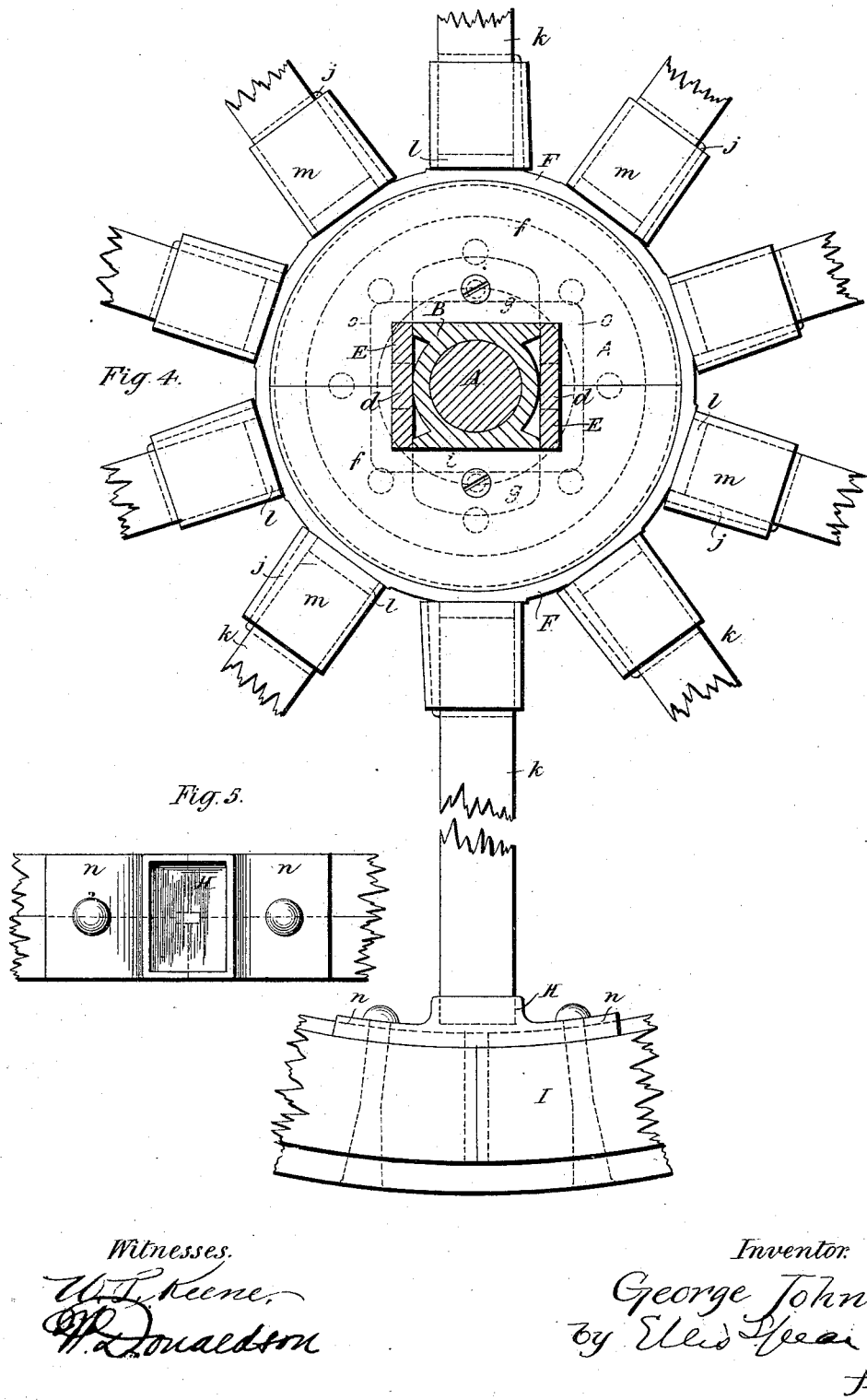

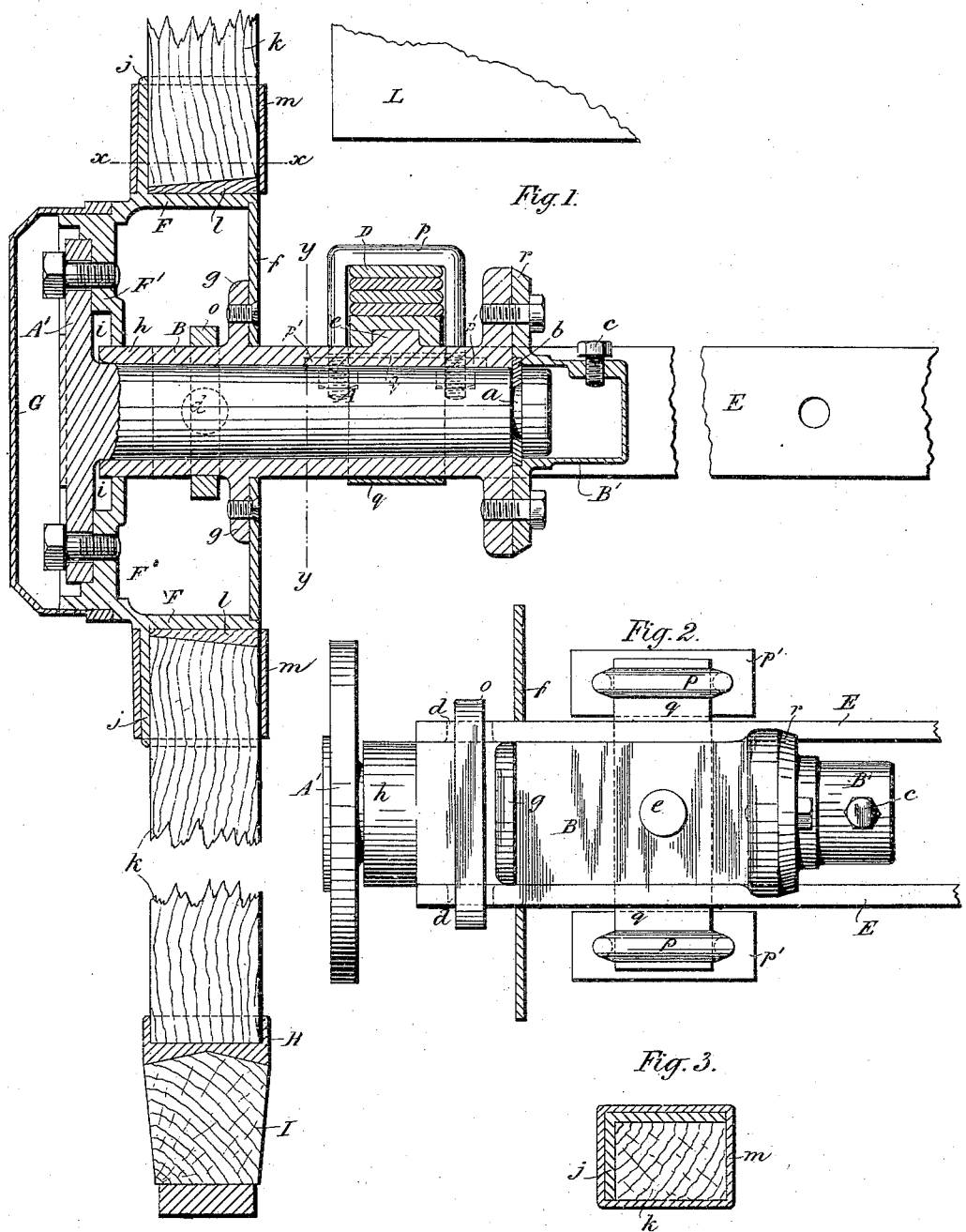

UNITED STATES PATENT OFFICE.

GEORGE JOHNSON, OF BATTERSEA, COUNTY OF SURREY, ENGLAND.

VEHICLE WHEEL AND AXLE.

SPECIFICATION forming part of Letters Patent No. 408,240, dated August 6, 1889.

Application filed April 17, 1889. Serial No. 307,607. (No model.)

*To all whom it may concern:*

Be it known that I, GEORGE JOHNSON, a subject of Her Majesty the Queen of Great Britain, residing at St. John's Hill, Battersea, in the county of Surrey, England, have invented a new and useful Improvement in the Construction and Mounting of Rotative Axle-Wheels for Vehicles, of which the following is a specification.

This invention relates to the construction and mounting of rotative axle-wheels for road-vehicles, the object being to practically combine the wheel and axle in one, to economize the roadway space occupied, and to gain an increase of strength and greater durability than heretofore attained in the construction of wheels for vehicles.

In carrying out my invention I make the axle with a broad head, and the nave of the wheel I make in the form of a hollow cylindrical box having a suitable wall or flange at its outermost end. To this flange and to either the inner or outer surface of it, but on a vertical plane outside of the tire, I fix the axle-head by means of screws, bolts, or rivets. Thus wheel and axle will revolve unitedly, and the weight or load carried will tend to balance the wheel and keep it upright. Around the nave are projections forming rectangular half-sockets for holding the spokes. In the preparation of the rim I fit and arrange the fellies in a caul, and having shrunk the tire on, it is then turned in a lathe or shaping machine to the required section. The ends of the spokes are placed in position in the half-sockets of the nave, and ferrules are placed over the taper ends of said half-sockets. I then insert the thin ends of wedges under the foot ends of the spokes, and by driving the wedges in the wheel is expanded and all the joints tightened up. The ferrules are then forced quite home, holding the nave, spokes, and wedges together, the result being perfect rigidity in all the parts. The axle is carried in a suitable axle-box fixed between two parallel bars which form the axle-tree. Said axle-box has a cap fitted on its inner end for oiling purposes, which assists in holding the axle in the axle-box.

To clearly explain the nature of my invention reference is made to the accompanying drawings, in which—

Figure 1 is a sectional elevation through the center of a portion of a wheel constructed according to my invention. Fig. 2 is a plan view, partly in section, showing the axle-box, axle, divided axle-tree, and dust-plate, and attachments for the spring. Fig. 3 is a section on the line $x\,x$, Fig. 1. Fig. 4 is a section and elevation on the line $y\,y$, Fig. 1, looking to the left; and Fig. 5 is a plan of one of the shoes or sockets secured to the rim in which the spokes are stepped.

The axle A has formed thereon a head A', and is capable of revolution in the axle-box B, both axle and box being preferably somewhat tapered to the inner end. Around the axle, at said inner end, is formed a groove $a$, in which seats a segmental collar $b$, formed in two or more parts. Said collar prevents the axle from being drawn out of the box, and is itself partly held in place by the cap B', secured to the axle-box B. This cap forms an oil-reservoir, from which the oil is drawn for lubricating the axle, the oil being conveniently introduced into same by the removal of the screw or stopper $c$.

The axle-box B carries three studs or projections $d\,d$ and $e$. The former assist in retaining the divided axle-tree in place, and the latter serves a similar purpose for the block of the spring D. The spring is held in place by the usual shackles $p$, the plates $p'$ of which are slipped under the bent ends or ears of a metal clip $q$, which embraces the bottom of the axle-box and sides of the axle-tree. The axle-tree itself consists of two metal bars E E, which embrace the sides of the axle-box, which are cut away or flattened for that purpose, as shown in Fig. 2, a shoulder being left which serves to support the inner end. The flange $r$ of the cap B' is also cut away, so that it may drop between the bars E E, a similar shoulder, which rests on the bars, being left on same. In addition to the assistance rendered by the studs $d\,d$, the axle-bars E E are retained in place by a collar or ring $o$, which is placed over and preferably shrunk upon them. They are further surrounded by a dust-plate $f$, which serves to close the interior of the cylindrical case or nave F, and which is formed in two parts, as shown in Fig. 4, secured by screws to projections $g\,g$, formed on the axle-box, while the periphery of said dust-plate seats in a rabbet formed in the cylindrical case or nave F.

The outer end $h$ of the axle-box is cylindrical in form and enters an opening in the wall or flange F' of the nave F, which around said opening is cut away to form a recess $i$, serving to receive and retain the oil, which works along the axle from the cap B'. The axle-head A' is bolted, riveted, or secured to said flange F', so that the nave will revolve with the axle. To incase and protect these parts from dust, I may employ a cap G, which slips on the nave F, and may be secured by set-screws, or in any convenient way. Around the nave F, and preferably cast therewith, are the half-sockets $j$, which receive the spokes $k$. The foot ends of these spokes are cut on a bevel, as shown in Fig. 1, and, as described, said spokes are tightened up by the wedges $l$, which are forced under their beveled ends when the rim is in place, the ferrules or collars $m$ being subsequently forced down, so as to inclose the sockets, spoke, and wedge. In place of beveling the foot ends of the spokes they may be square, as usual, and double wedges be employed, one being first inserted and the second being driven in to tighten up. The outer ends of the spokes are held in sockets or shoes H, which are secured to the rim I by means of bolts or rivets. These sockets have preferably an extension or flange $n$ on either side to give the spoke a wider bearing upon the rim or felly. As shown in Fig. 1, the under side of the shoe is formed with two angle-faces, which seat upon the correspondingly-shaped surface of the rim.

The position of the vehicle-body is indicated at L, from which it will be seen that by my construction the wheel can be brought near to the body.

What I claim, and desire to secure by Letters Patent, is—

1. In combination with the axle and box, the nave having the vertical flange F', secured to the axle, and a horizontal flange extending inwardly toward the vehicle, said horizontal portion having bearings or sockets for the spokes.

2. In combination, the box, the axle having the head A', and the nave having the flange F' secured thereto.

3. In combination, the box, the axle having the head A' and the nave, the nave having the vertical flange F' secured thereto, the said parts being arranged and constructed with the oil-chamber at the outer end of the box, substantially as described.

4. In combination, the box, the axle, and the nave secured thereto, said axle having an oil-chamber at its front and rear end, substantially as described.

5. In combination, the axle, the nave secured thereto, the box for the axle, and an oil-chamber B', secured to the rear end of the box and over the end of the axle, substantially as described.

6. In vehicle-wheels, the combination, with spokes and suitable wedges, of half-sockets in which said spokes are held and ferrules or collars by which they are secured, substantially as described.

7. In the mounting of vehicle-wheels, the combination, with the nave and axle-box, of an axle-tree composed of two parallel bars adapted to hold said axle-box, substantially as set forth.

In testimony whereof I have hereunto set my hand in the presence of two subscribing witnesses.

GEORGE JOHNSON.

Witnesses:
PHILIP M. JUSTICE,
ALLEN B. JONES.